June 27, 1950

P. H. J. BROUWER 2,512,848

TWO-PART SHEET METAL STATOR ASSEMBLY
FOR ELECTRIC MOTORS
Filed Feb. 7, 1947

*PIETER HENDRIK JOHANNES BROUWER*
INVENTOR.

BY

AGENT

Patented June 27, 1950

2,512,848

UNITED STATES PATENT OFFICE 2,512,848

TWO-PART SHEET METAL STATOR ASSEMBLY FOR ELECTRIC MOTORS

Pieter Hendrik Johannes Brouwer, Eindhoven, Netherlands, assignor to Hartford National Bank and Trust Company, Hartford, Conn., as trustee Application February 7, 1947, Serial No. 727,078 In the Netherlands August 11, 1944

Section 1, Public Law 690, August 8, 1946 Patent expires August 11, 1964

3 Claims. (Cl. 171—252)

Various constructions of stators for electric apparatus have already come to be known, in which the stator consists of two halves which are built together in an axial direction with the interposition of a coil, and in which each half comprises a certain number of tabs that are punched out in a radial direction towards the centre and bent over in an axial direction, these tabs constituting a certain number of stator terminals. This yields a simple stator construction, which is used in a wide range of applications, for instance in dry shaving apparatus, hand dynamos and bicycle dynamos or the like, since such a construction is eminently suitable for mass-production.

The invention has for its purpose to improve the aforesaid known stator by an expedient which yields material advantages in mass-production.

According to the invention in a stator of the aforesaid kind, central parts of one or both halves serve to support the shaft of the rotor. This ensures a precise centreing of the bearing, since the supports constitute an inseparable assembly with the stator. Moreover, the supports are obtained in a very simple manner, in fact automatically by punching, thus dispensing with a separate operation.

According to another feature of the invention, it is possible to obtain a construction, in which besides the punched and bent-over tabs constituting the stator pole pieces, a certain number of tabs is punched out in a radial direction towards the centre and more particularly nearer to the outer edge, so as to form, after bending over in an axial direction, the connecting yokes between the two halves, thus jointly forming the outline of the coil. This also provides a simplification and, moreover, a saving of material in the manufacture of the stator.

In order that the invention may be more clearly understood and readily carried into effect it will now be described more fully with reference to the accompanying drawing, in which.

Figure 1:
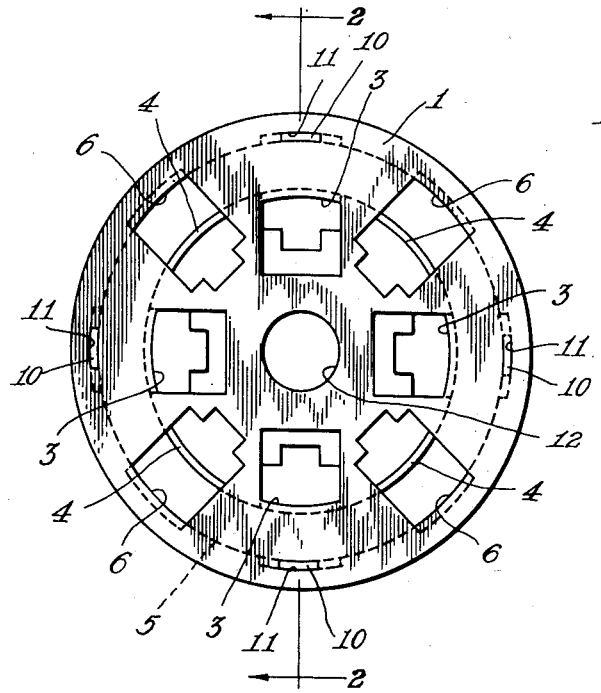
Figure 1 is a side view of a stator in accordance with the invention.
Figure 2:
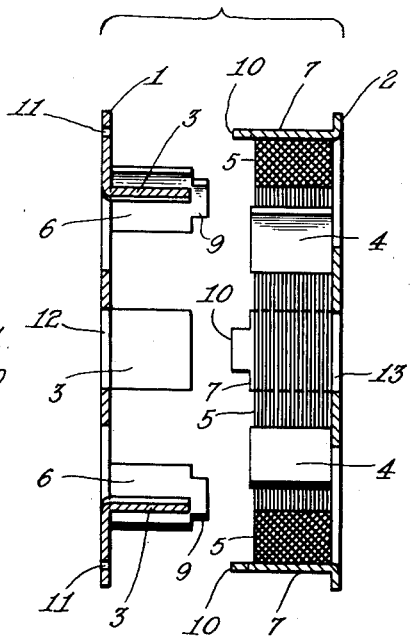
Fig. 2 is a cross-section view taken along the line 2—2 of Fig. 1.

In the present case each of the two halves to be built together in an axial direction consists of a circular plate 1 and 2 respectively, each of which is furnished with a certain number of tabs 3 and 4 respectively which are punched out in the radial direction towards the centre and are bent over in an axial direction, these tabs constituting a certain number of stator terminals. The terminals 4 are surrounded by an annular coil 5. The plate shaped half 2 is turned through an angle of 45° with respect to the half 1, so that the terminals 3 and 4 respectively are located alternately along the periphery and are uniformly spaced apart, thus forming an 8-polar construction.

Moreover, four tabs 6 and 7 respectively are punched out of each of the stator halves; they extend in a radial direction towards the centre and nearer to the outer edge 8. After bending over in an axial direction these tabs constitute connecting yokes between the two halves. To such end these tabs have a narrow end 9 and 10 respectively which may be clamped or riveted in apertures 11 of the other half. In this way the two halves 1 and 2 in the right-hand figure, upon being built together in an axial direction, constitute a stator incorporating the coil.

The undisturbed parts of one of the two halves 1 and 2 respectively, which are cross-hatched in the left-hand figure, act as bearing supports. The bearings, which are not represented in the drawing for simplicity's sake, are secured in the apertures 12 and 13 respectively. When making use of a single bearing only one of the two halves may be equipped with supporting means according to the invention.

What I claim is:

1. A stator member for an electric apparatus, comprising a first disc-like portion, a second disc-like portion and an annular coil, all adapted to be coaxially assembled with the coil between the portions, said portions each being provided near the center with an annular arrangement of a like number of tab-like parts punched out and bent over in an axial direction, said parts constituting stator pole-pieces, said portions each being further provided with a like number of annularly arranged tab-like parts punched out adjacent to the outer edge and bent over in an axial direction to constitute connecting yokes between the disc-like portions, the center parts of the said portions serving to support a rotor shaft bearing.

2. A stator member for an electric apparatus, comprising a first disc-like portion, a second disc-like portion and an annular coil, all adapted to be coaxially assembled with the coil between the portions, said portions each being provided near the center with an annular arrangement of a like number of tab-like parts punched out and bent over in an axial direction, said parts constituting stator pole-pieces, said portions each being further provided with a like number of annularly arranged tab-like parts punched out adjacent to the outer edge thereof and bent over in an axial direction to constitute connecting yokes between the disc-like portions, each of said portions being additionally provided with peripheral apertures for attaching the said connecting yokes, the center part of each of the said portions serving to support a rotor shaft bearing.

3. A stator member for an electric apparatus, comprising a first disc-like portion, a second disc-like portion and an annular coil, all adapted to be coaxially assembled with the coil between the portions, said portions each being provided near the center with an annular arrangement of a like number of tab-like parts punched out and bent over in an axial direction, said parts constituting stator pole-pieces, said portions each being further provided with a like number of annularly arranged tab-like parts punched out adjacent to the outer edge thereof and bent over in an axial direction to constitute connecting yokes between the disc-like portions, each of the said portions being additionally provided with peripheral apertures for attaching the said connecting yokes, the center part of each of the said portions being provided with an aperture for supporting and positioning a rotor shaft.

PIETER HENDRIK JOHANNES BROUWER.

REFERENCES CITED

The following references are of record in the file of this patent:

UNITED STATES PATENTS

| Number | Name | Date |
| --- | --- | --- |
| 1,959,391 | Spencer | May 22, 1934 |
| 2,432,070 | Sanborn | Dec. 2, 1947 |